Figure 11:
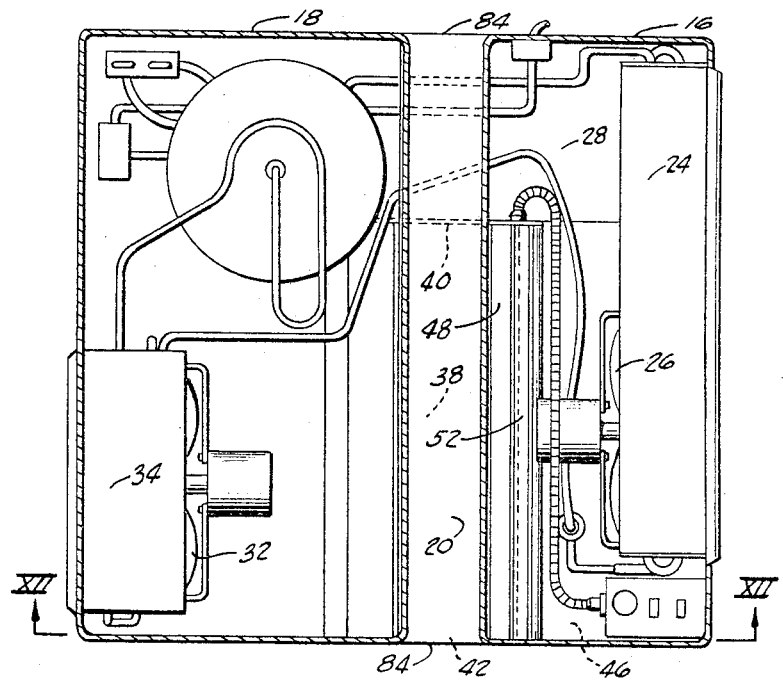

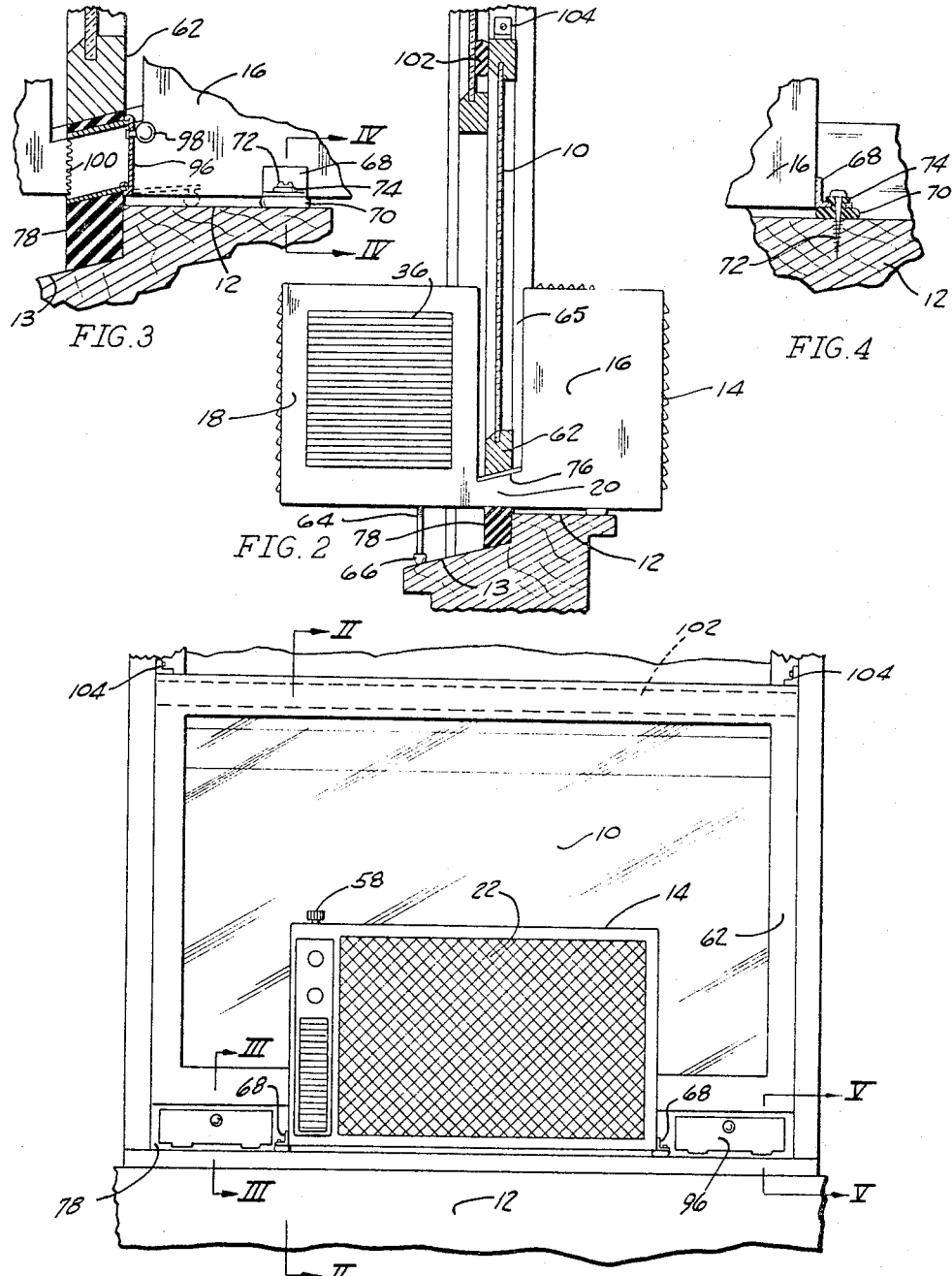

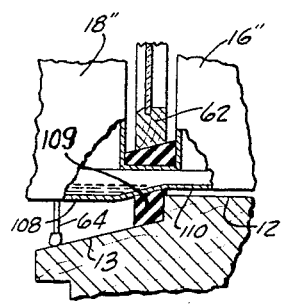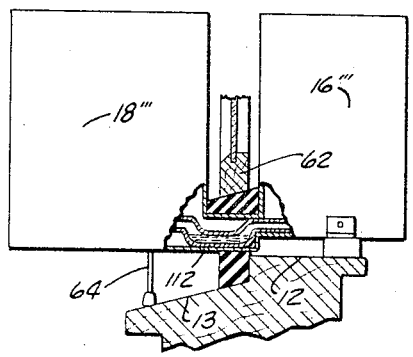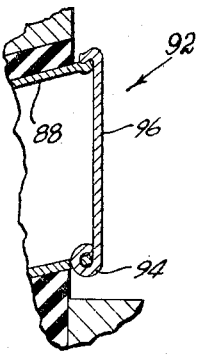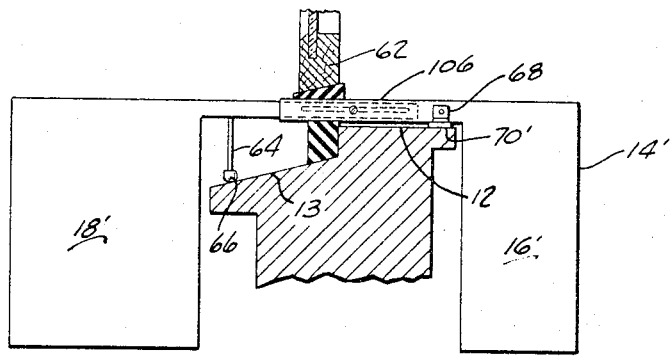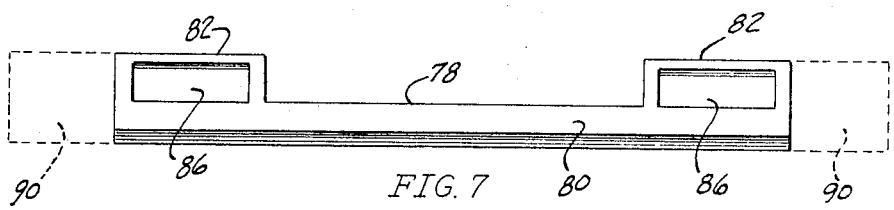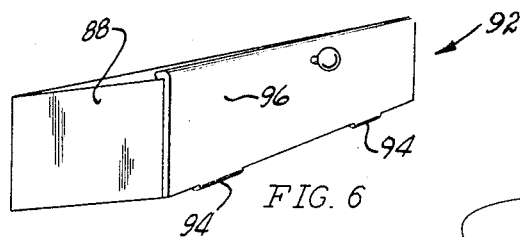

Sept. 13, 1966  V. C. KNIGHT  3,271,972
WINDOW AIR CONDITIONING UNIT
Filed Oct. 21, 1964  3 Sheets-Sheet 3

INVENTOR
VERNE C. KNIGHT
BY Beaman Beaman
ATTORNEYS

з,271,972
Patented Sept. 13, 1966

3,271,972
WINDOW AIR CONDITIONING UNIT
Verne C. Knight, Addison, Mich., assignor, by mesne assignments, to Addison Products Company, a corporation of Michigan
Filed Oct. 21, 1964, Ser. No. 405,518
6 Claims. (Cl. 62—262)

The present invention relates to improvements in apparatus for cooling and/or ventilating living space and accessories therefor, being particularly concerned with room coolers of the kind mounted in a window or other wall opening and having the advantages of the type disclosed in the Lipman Patent 2,604,763, granted July 29, 1952.

Window air conditioning units are to a great extent purchased and installed just before or during the summer months. Unseasonal weather may create a sudden demand for the same with attendant difficulties in the delivery and installation of such units. Complicated and unsightly installation of window units have acted to retard the general use thereof.

According to the invention, apparatus of the above-described type is provided which may be readily installed in a window, or other wall opening, and removed for cold weather storage by unskilled persons. As installed, obstruction by the apparatus to vision through the window opening has been reduced to a minimum. At the same time, weatherproofing of the apparatus in the window opening is simple and effective. Further, the design of the apparatus and its installation lends itself to providing adequate natural ventilation through the window opening in cool weather, as well as mechanical ventilation.

Thus, one object of the invention is to provide an improved window unit for space cooling and ventilating of the type in which a sliding window sash may be substantially lowered between adjacent sections of the unit disposed upon opposite sides of the sash.

Another object is to provide improvements in the weatherproofing of units of the type mentioned in the preceding paragraph.

A further object of the invention is to provide weatherproofing for window units of the described type in which means for natural ventilation has been provided.

A still further object is to provide an improved window air conditioning unit in which the compressor noises have been substantially insulated from the interior living space.

Another object is to provide a unit of the type described in which the drainage of condensate from the evaporator unit has been provided in an improved manner.

Another object is to provide an air conditioning unit for sliding sash windows in which the evaporator and condenser sections are disposed on opposite sides of the sash with such sections being relatively adjustable to each other and to the window sill and stool.

A further object is to provide simplified valve and conduit structure for selectively exhausting inside air and introducing outside fresh air.

These and other objects and advantages of the present invention will become apparent from the following specification and the appended claims.

Figure 12:
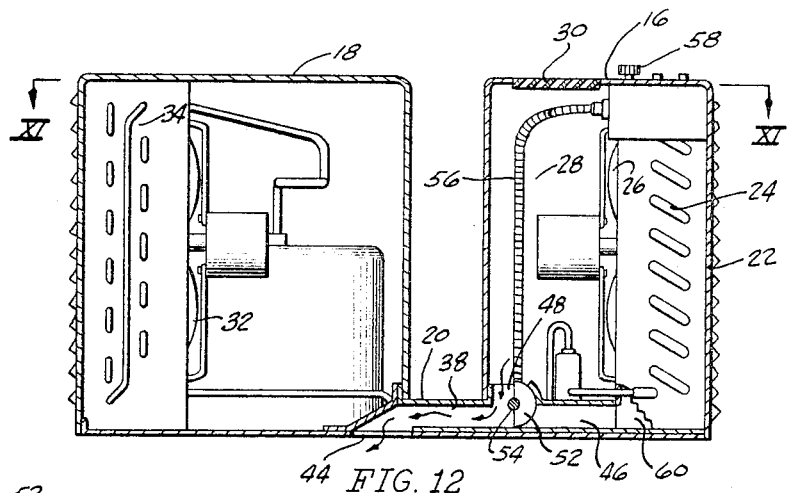
Figures 13, 14:
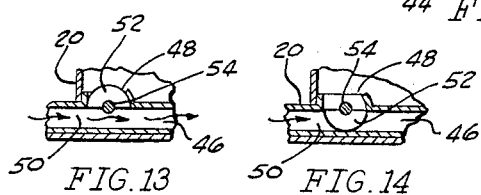

In the drawings,

FIG. 1 is an elevational view of the improved air conditioning unit as it appears installed in a double hung sliding sash window, FIG. 2 is a vertical, cross-sectional view taken on line II—II of FIG. 1, FIG. 3 is a view similar to FIG. 2 taken on line III—III of FIG. 1, FIG. 4 is a vertical, sectional view of the mounting structure taken on line IV—IV of FIG. 3, FIG. 5 is a vertical, sectional view of the inserted ventilator section taken on line V—V of FIG. 1, FIG. 6 is a perspective view of a ventilator section prior to being inserted in the weatherproofing filler strip, FIG. 7 is a front, elevational view of the lower filler strip as molded, FIG. 8 is a view similar to FIG. 2 of a modified form of the invention, FIGS. 9 and 10 illustrate different arrangements for handling condensate between the evaporator and the condenser sections, FIG. 11 is a plan view of the unit removed from the window opening and with the tops of the evaporator and condenser sections shown removed along line XI—XI of FIG. 12, FIG. 12 is a side elevational view of FIG. 11 with the sides of the evaporator and condenser sections removed along the line XII—XII of FIG. 11 and showing inside air being exhausted from the evaporator section, FIG. 13 is a fragmentary view of a portion of FIG. 12 showing the ventilating and exhaust valve in a position to admit fresh air to the evaporator section, and FIG. 14 is a view similar to FIG. 13 showing the valve in a closed weatherproofing position.

Referring to FIGS. 1 through 4 and 11 through 14, in particular, a double hung sliding sash window 10, having a sill 12 and a stool 13, is shown in a substantially closed position on a window air conditioning unit 14 comprising an evaporator section 16 and a condenser section 18 separated from each other by a common shallow tunnel-like connector portion 20. The refrigerant connections between the sections 16 and 18 are located in the portion 20 in any suitable manner, such as described in the aforesaid Lipman patent.

As shown, interior air is drawn in through the inlet grill 22 of the section 16 through the heat-exchanger 24 by the fan 26 to pressurize the space 28 and discharge the cooled air through the outlet grill 30. A fan 32 in the section 18 blows the exterior air through the heat-exchanger 34 and discharges the warmed air through the discharge grill 36.

When it is desired to exhaust air from the interior of the room, as well as to ventilate the air of the room with fresh outside air, means may be provided for air passage in selected opposite directions through the connector portion 20.

As shown in FIGS. 11 through 14, the portion 20 has a narrow tubular slot 38 extending between the vertical wall portions 40 and 42 which communicates on one side with an elongated discharge opening 44 and on the opposite side with a pair of narrow slots 46 and 48 through a common narrow opening 50 controlled by an elongated semicyclindrical valve 52. The valve 52 is supported for rotation through 270° about a shaft 54 to which a flexible shaft 56 is connected to enable the shaft 54 and valve 52 to be manually rotated by the knob 58.

When the valve 52 is in the position shown in FIG. 12, a portion of the air drawn into the space 28 by the fan 26 will be forced out through the slot 48 to be discharged through the opening 44 to the outside atmosphere. It will be noted that the valve 52 in this position is closing the slot 46 which extends to the space 60 of the heat-exchanger 24 maintained at a reduced pressure by the fan 26.

With the valve 52 in the position of FIG. 13, the slot 48 is closed and the reduced pressure in the space 68 will cause fresh air to flow in through the opening 44 through the slot 46 and the space 60 from which it is drawn by the fan 26 into the space 28 to be discharged through the outlet grill 30 into the interior of the room. In FIG. 14 the valve 52 is shown in a position closing both the slots 46 and 48 to weatherproof the section 16 from the opening 44.

The sound insulation and weatherproofing of unit 14 is such that unit 14 may be readily and conveniently installed in the window 10, or other wall opening, by unskilled persons. With the lower sash 62 of the window 10 raised, the unit 14 is centered in the window 10 with the channel 64 defined by the spacing of the sections 16 and 18 vertically aligned with the sash 65. Adjustable legs 64, having resilient tips 66, are carried on the section 18 to provide the necessary support and leveling for the exterior portion of the unit 14 upon the stool 13. L-shaped brackets 68 attached to the section 16 rest on the resilient pad 70 with the unit 14 being held against shifting or tilting on the sill 12 by screws 72 extending through the enlarged holes in the brackets 68 and insulated from the brackets 68 by resilient washers 74 located between the underside of the heads of screws 72 and the top surface of the horizontal leg of each bracket 68.

Before lowering the sash 62, a suitable insulating and weatherproofing strip 76 of rubber, urethane foam or the like is preferably disposed on the upper surface of the connector portion 20. Sound insulating and weatherproofing in the window 10 in the area below the unit 14 and at the opposite sides can be carried out in many ways with filler structure 78 of vertical dimension sufficiently to occupy the clearance between the lower edge of sash 62 and the sill 12 and stool 13 caused by the amount of interference offered by the depth of the connector 20 to the lowering of the sash 62.

Preferably, the clearance between the sash 62 and sill 12 and stool 13 (with the unit 14 installed in the window 10 and the sash 62 lowered and pressing against the strip 76) is filled by a separate strip 78 which is disposed in the plane of the sash 62. The strip 78 has a center portion 80 extending beneath the connector portion 20 and end portions 22 abutting the vertical sides 84 of the portion 20 and extending between the sides 84 and the surfaces of the window 10 which would otherwise normally be engaged by the sash 62 when fully lowered.

The filler strip 78 may be of any suitable material and will normally be elastomer is character. In the form illustrated, the strip 78 is a molded, semirigid urethane foam having openings 86 into which the ventilator units 88 may be inserted. The strip 78 may be molded in lengths that will fit a wide range of window widths and the end portions 90, shown in dotted lines in FIG. 7, may be cut off at the time of installation of the window unit to fit the particular size window into which the unit 14 is to be installed.

The ventilator units 88 are, preferably, of relatively rigid construction being fabricated from plastic or sheet metal and taking the form of a tubular, rectangular shell 92 of slightly larger dimensions than the openings 86 to enable the shell 92 to be inserted into the openings 86 in the strip 78 with a tight fit. Attached to the shell 92 by suitable hinge structure 94 is a hinged vent plate 96 having a knob 98 for opening and closing the plate 96 to provide natural ventilation as desired through the clearance between the sash 62 and the sill 12 and stool 13.

In opposed relation to the plate 96 is a screen 100 provided across the shell 92 to prevent insects from entering. In practice, the clearance between the lower edge of the sash 62, sill 12 and stool 13 would be in the order of 1¼" to 2¼". This will result in an effective opening through the ventilator units 88 being in the order of 1" x 5" which will provide sufficient ventilation through the window 10 under conditions during which the unit 14 is not normally operated. Installation of the unit 14 is completed by the insertion of a filler strip 102 between the upper and lower sash of the window 10 and the detachable application of suitable stops 104 disposed between the frame of the window 10 and the upper edge of the sash 62 to prevent unauthorized raising of the sash 62.

A modified form of the invention is shown in FIG. 8 in which the air conditioning window unit 14 has a "saddle bag" type of mounting on the sill 12 and stool 13. The evaporator section 16' and the condenser section 18' are connected to each other by an extensible and contractible section 106 in which the refrigerant lines are disposed and take the form of flexible loops or bends to enable relative adjustment between the sections 16' and 18'.

To reduce the length of the adjustable supporting and leveling screws 64, the drain pan portion of the condenser section may be stepped down as compared to the drain pan portion of the evaporator section. In FIG. 9 such an arrangement is shown wherein the bottom 108 of the drain pan portion of the condenser section 18" is shown lower than the drain pan portion 110 of the evaporator section 16". The connector section is indicated at 109. If the bottoms 108 and 110 were in the same horizontal plane, the distance of the bottom 108 from the stool 13 would require the use of longer adjustment screws 64.

To improve the weatherproofing of the window unit by avoiding back drafts due to high wind velocities through the condensate drain structure, an arrangement is shown in FIG. 10 wherein the drain pan portions of the evaporator and condenser sections 16''' and 18''', respectively, are connected by a drain tube 112 so shaped as to provide a condensate trap to seal the section 16''' against back draft.

It will be appreciated that the window unit 14 and its associated noise-insulating and windowproofing structure provide minimum obstruction to the view through window 10. By removing the stops 104, window 10 may be readily raised for washing or for removing or servicing the unit 14. With the condenser section 18 insulated from the interior of the living space by the window 10 and the weatherproofing structure between the sash 62 and the sill 12 and stool 13, compressor noises from the section 18 are substantially reduced in the living space as compared to conventional window units in general use at this time.

It will be apparent that there is nothing about the location of the unit 14 in the window or other wall opening, or in the weatherproofing of the unit 14 with respect to the sash 62, that requires the use of skilled personnel. To the contrary, the unit 14 and its associated sound-insulating and weatherproofing structure may be readily installed by the purchaser of the unit, thus enabling same day over-the-counter sale and purchaser installation during hot weather spells which have the effect of materially stimulating the sale and use of window air conditioning units.

While unit 14 is especially designed to be installed in a window opening, it will be readily appreciated by those skilled in the art that unit 14 lends itself to installation in other forms of openings in living and working quarters.

Having thus described my invention, what I claim as new and desire to protect by Letters Patent is:

1. In the combination with apparatus for cooling and ventilating living space of the type having a pair of heat-exchanger sections disposable on opposite sides of a wall opening with said sections being separated from each other throughout the major portion of their vertical projections and having a connector section common to said sections of shallow vertical projections, the wall opening having closure means disposable between said heat-exchanger sections and overlying said connector section, of sound and weatherproofing means for the wall opening being disposed in a vertical plane thereof and being located on opposite sides of said connector section and approximating in vertical projections the clearance between the wall opening and the closure means, said sound and weatherproofing means having a ventilating opening therein.

2. In the combination of claim 1, said sound and weatherproofing means having a ventilating opening therein, and adjustable ventilating structure disposed in said ventilating opening.

3. In combination with apparatus for cooling and ventilating living space of the type having a pair of heat exchanger sections disposable upon opposite sides of a wall opening with said sections being separated from each other throughout the major portion of their vertical projections and having a connector common to said sections of shallow vertical projections, the wall opening having closure means disposable between said heat exchanger sections and overlying said connector sections, of sound and weatherproofing means of an axial length to span the wall opening and being disposed in a vertical plane thereof and extending below said connector section with end portions axially projecting beyond the opposite sides thereof, said end portions approximating in vertical projections the clearance between the wall opening and the closure means, said sound and weatherproofing means being in the form of a filler strip having opposite end portions to fill the clearance between the wall opening and the closure means as lowered upon said connector section and a central portion of lesser thickness to fill the clearance between the wall opening and the underside of said connector section.

4. As an article of manufacture, a sound and weatherproof filler strip for apparatus of the type described which, when mounted in a wall opening, has clearance with the wall opening in the form of an elongated strip of semirigid foam material having a ventilating opening therein, said strip being shaped to fill the clearance between the wall opening and apparatus disposed in the wall opening.

5. In apparatus of the type described, an evaporator section, a condenser section, a condensate drain structure associated with said sections for collecting condensation taking place in the evaporator section and for discharging condensation from the condenser section collected from the evaporator section, said sections being horizontally disposed in spaced side-by-side relation to enable sound baffling means to be partially inserted between said sections, a connector section between said first and second sections, and a condensate trap disposed in said connector section and constituting a drainage for said condensate drain structure to prevent back draft between said sections.

6. In apparatus of the type described, an evaporator section, a condenser action in horizontally disposed side-by-side relation to said first section, a common connector portion for said sections of shallow depth to enable sound baffling means to be partially inserted between said sections, said sections having bottom portions in offset relation to each other with respect to a horizontal plane, said common connector being disposed between the portions of said section.

References Cited by the Examiner

UNITED STATES PATENTS

| | | | |
|---|---|---|---|
| 2,130,930 | 9/1938 | Rose | 62—291 |
| 2,320,436 | 6/1943 | Hull | 62—262 |
| 2,500,852 | 3/1950 | Money | 62—262 |
| 2,519,086 | 8/1950 | Eberhart | 62—262 |
| 2,604,763 | 7/1952 | Lipman | 98—94 |
| 2,711,086 | 6/1955 | Eilers | 98—94 |
| 2,711,087 | 6/1955 | Jennings | 62—262 |
| 2,927,442 | 3/1960 | Kooiker | 62—280 |
| 2,946,274 | 7/1960 | Grimes | 62—262 |
| 3,030,873 | 4/1962 | Metcalfe | 98—94 |
| 3,128,689 | 4/1964 | Binsfeld | 62—262 |
| 3,152,456 | 8/1964 | Prendegast | 61—262 |

WILLIAM J. WYE, *Examiner.*

UNITED STATES PATENT OFFICE
CERTIFICATE OF CORRECTION

Patent No. 3,271,972 September 13, 1966

Verne C. Knight

It is hereby certified that error appears in the above numbered patent requiring correction and that the said Letters Patent should read as corrected below.

Column 6, line 11, for "action" read -- section --.

Signed and sealed this 29th day of August 1967.

(SEAL)
Attest:

ERNEST W. SWIDER
Attesting Officer

EDWARD J. BRENNER
Commissioner of Patents